(12) United States Patent
Fujimaki et al.

(10) Patent No.: US 8,731,881 B2
(45) Date of Patent: May 20, 2014

(54) MULTIVARIATE DATA MIXTURE MODEL ESTIMATION DEVICE, MIXTURE MODEL ESTIMATION METHOD, AND MIXTURE MODEL ESTIMATION PROGRAM

(75) Inventors: Ryohei Fujimaki, Tokyo (JP); Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/824,857

(22) PCT Filed: Mar. 16, 2012

(86) PCT No.: PCT/JP2012/056862
§ 371 (c)(1),
(2), (4) Date: May 1, 2013

(87) PCT Pub. No.: WO2012/128207
PCT Pub. Date: Sep. 27, 2012

(65) Prior Publication Data
US 2013/0211801 A1 Aug. 15, 2013

(30) Foreign Application Priority Data
Mar. 18, 2011 (JP) ................................ 2011-060732

(51) Int. Cl.
*G06K 9/62* (2006.01)
*G06F 17/18* (2006.01)
(52) U.S. Cl.
CPC .............. *G06K 9/6226* (2013.01); *G06F 17/18* (2013.01)
USPC .......................................................... 703/2
(58) Field of Classification Search
None
See application file for complete search history.

(56) References Cited

U.S. PATENT DOCUMENTS

| 7,657,102 B2 * | 2/2010 | Jojic et al. ...................... 704/245 |
| 8,504,491 B2 * | 8/2013 | Thiesson et al. ................ 706/12 |
| 2012/0323834 A1 * | 12/2012 | Fujimaki ......................... 706/46 |

FOREIGN PATENT DOCUMENTS

| JP | 2001-202358 A | 7/2001 |
| JP | 2008-191467 A | 8/2008 |

(Continued)

OTHER PUBLICATIONS

Dai, Xiaofeng, et al. "A Joint Finite Mixture Model for Clustering Genes from Independent Gaussian and Beta Distributed Data" BMC Bioinformatics, vol. 10, pp. 165-181 (2009) available from <http://www.biomedcentral.com/1471-2105/10/165>.*

(Continued)

*Primary Examiner* — Dwin M Craig
*Assistant Examiner* — Jay B Hann
(74) *Attorney, Agent, or Firm* — Sughrue Mion, PLLC

(57) ABSTRACT

With respect to the model selection issue of a mixture model, the present invention performs high-speed model selection under an appropriate standard regarding the number of model candidates which exponentially increases as the number and the types to be mixed increase. A mixture model estimation device comprises: a data input unit to which data of a mixture model to be estimated, candidate values of the number of mixtures which are required for estimating the mixture model of the data, and types of components configuring the mixture model and parameters thereof, are input; a processing unit which sets the number of mixtures from the candidate values, calculates, with respect to the set number of mixtures, a variation probability of a hidden variable for a random variable which becomes a target for mixture model estimation of the data, and estimates the optimal mixture model by optimizing the types of the components and the parameters therefor using the calculated variation probability of the hidden variable so that the lower bound of the posterior probabilities of the model separated for each component of the mixture model can be maximized; and a model estimation result output unit which outputs the model estimation result obtained by the processing unit.

17 Claims, 2 Drawing Sheets

(56) References Cited

FOREIGN PATENT DOCUMENTS

| JP | 2010-039723 A | 2/2010 |
|---|---|---|
| JP | 2010-170422 A | 8/2010 |
| JP | 2010-257269 A | 11/2010 |

OTHER PUBLICATIONS

Petrushin, Valery A. "Hidden Markov Models: Fundamentals and Applications Part 1: Markov Chains and Mixture Models" Online Symposium for Electronics Engineer (2000) available at <http://www.eecis.udel.edu/~lliao/cis841s06/hmmtutorialpart1.pdf>.*

Kleinberg, E.M. "Stochastic Discrimination" Annals of Mathematics & Artificial Intelligence, vol. 1, pp. 207-239 (1990).*

Jain, Anil K., et al. "Statistical Pattern Recognition: A Review" IEEE Trans. on Pattern Analysis & Machine Intelligence, vol. 22, No. 1, pp. 4-37 (2000).*

Ryohei Fujimaki et al., "Linear Time Model Selection for Mixture of Heterogeneous Components via Expectation Minimization of Information Criteria", Technical Report on Information Based Induction Science, Oct. 19, 2009, pp. 312-319.

Kenji Yamanishi et al., "On-line Unsupervised Outlier Detection Using Finite Mixtures with Discounting Learning Algorithms", Proceedings of Sixth ACM SIGKDD International Conference on Knowledge Discovery and Data Mining, (KDD2000), ACM Press, 2000, pp. 320-324.

Kenji Yamanishi et al., "Dynamic Syslog Mining for Network Failure Monitoring", Proceedings of the Eleventh ACM SIGKDD International Conference on Knowledge Discovery and Data Mining, 2005, pp. 499-508.

A.P. Dempster et al., "Maximum Likelihood from Incomplete Data via the EM Algorithm", Journal of Royal Statistical Society, Series B, 1977, pp. 1-38, vol. 39, No. 1.

Adrian Corduneanu et al., "Variational Bayesian Model Selection for Mixture Distributions", In Artificial Intelligence and Statistics, 2001, pp. 27-34.

Carl Edward Rasmussen, "The Infinite Gaussian Mixture Model", Advances in Neural Information Processing Systems 12, 2000, pp. 554-560.

Ryohei Fujimaki et al., "Linear Time Model Selection for Mixture of Heterogeneous Components", Proceedings of the 1st Asian Conference on Machine Learning, 2009, pp. 1-15.

* cited by examiner

MULTIVARIATE DATA MIXTURE MODEL ESTIMATION DEVICE, MIXTURE MODEL ESTIMATION METHOD, AND MIXTURE MODEL ESTIMATION PROGRAM

CROSS REFERENCE TO RELATED APPLICATIONS

This application is a National Stage of International Application No. PCT/JP2012/056862 filed on Mar. 16, 2012, which claims priority from Japanese Patent Application No. 2011-060732, filed on Mar. 18, 2011, the contents of all of which are incorporated herein by reference in their entirety.

TECHNICAL FIELD

The present invention relates to a multivariate data mixture model estimation device, a mixture model estimation method, and a mixture model estimation program, and more particularly, to a multivariate data mixture model estimation device, a mixture model estimation method, and a mixture model estimation program for estimating the number, types, and parameters of models to be mixed.

BACKGROUND ART

A mixture model (mixture distributions) for representing data using a plurality of models is important in industrial applications. There are various examples thereof such as a mixture normal distribution model and a mixture hidden Markov model. For example, such a mixture model is industrially used for finding a dishonest medical bill based on an observed outlier (Non Patent Literature 1) or detecting a network failure (Non Patent Literature 2). In addition, other important application examples of mixture models include customer behavior clustering in marketing (study on the assumption that similar customers belong to the same model) and analysis on topics of articles (study on the assumption that articles of the same topic belong to the same model).

Generally, in the case where the number of mixture (mixture number) of a plurality of models constituting a mixture model (also called components) and the types of components are specified, well-known methods such as an EM algorithm (Non Patent Literature 3) and a variational Bayesian method (Non Patent Literature 4) can be used to specify parameters of distributions (models). It is necessary to determine a mixture number and component types for estimating such parameters. The issue of specifying such models is generally called "model selection issue" or "system identification issue," and considered as an important issue for constructing reliable models. Therefore, many techniques relating to the issue have been proposed.

For example, methods of selecting a model that has a maximum posterior probability are known as methods for determining the number of models to be mixed. Methods proposed for that purpose are: 1) a method based on the amount of Bayesian information; 2) a method based on a variational Bayesian method (for example, Non Patent Literature 4); 3) a method based on nonparametric Bayesian estimation using a Dirichlet process (for example, Non Patent Literature 5); etc.

CITATION LIST

Non Patent Literature

{NPL 1} Kenji Yamanishi, Jun-ichi Takeuchi, Graham Williams, and Peter Milne, "Online Unsupervised Outlier Detection Using Finite Mixtures with Discounting Learning Algorithms", Proceedings of the Sixth ACM SIGKDD International Conference on Knowledge Discovery and Data Mining (KDD2000), ACM Press, 2000, pp. 320-324.
{NPL 2} Kenji Yamanishi, and Yuko Maruyama, "Dynamic Syslog Mining for Network Failure Monitoring", Proceedings of the Eleventh ACM SIGKDD International Conference on Knowledge Discovery and Data Mining (KDD2005), ACM Press, 2005, pp. 499-508.
{NPL 3} A. P. Dempster, N. M. Laird, and D. B. Rubin, "Maximum Likelihood from Incomplete Data via the EM Algorithm", Journal of Royal Statical Society. Series B (Methodological), Vol. 39, No. 1, 1977, pp. 1-38.
{NPL 4} Adrian Corduneanu and Christopher M. Bishop, "Variational Bayesian Model Selection for Mixture Distributions", In Artificial Intelligence and Statistics 2001, T. Jaakkola and T. Richardson (eds.), Morgan Kaufmann, pp. 27-34.
{NPL 5} Carl Edward Rasmussen, "The Infinite Gaussian Mixture Model", in Advances in Neural Information Processing Systems 12, S. A. Solla, T. K. Leen and K.-R. Muller (eds.), MIT Press (2000), pp. 554-560.
{NPL 6} Ryohei Fujimaki, Satoshi Morinaga, Michinari Monmma, Kenji Aoki and Takayuki Nakata, "Linear Time Model Selection for Mixture of Heterogeneous Components", Proceedings of the 1st Asian Conference on Machine Learning, 2009.

SUMMARY OF INVENTION

Technical Problem

According to the method 1), model selection is possible without establishing an assumption about a prior distribution of a model. However, in this case, a Fischer information matrix of a mixture model becomes nonregular, and thus criteria cannot be correctly defined and a proper mixture number cannot be selected.

According to the methods 2) and 3), a mixture number is determined using a Dirichlet distribution and a Dirichlet process as an anterior distribution for a mixture ratio. However, in this case, it is difficult to select an optimal mixture number as compared with general methods in which a model resulting in a high model posterior probability is selected.

In addition, according to the methods 1) to 3), it is practically impossible to optimize types of models to be mixed because of the amount of calculation. As an example for figuring out the amount of calculation, selection of a mixture polynomial curve will now be explained.

A polynomial curve includes first to high-order terms such as a linear term (first-order curve term), a second-order curve term, and a third-order curve term. Therefore, if an optimal model is selected after searching a mixture number from 1 to $C_{max}$ and the order of a curve from first to $D_{max}$, according to the above-described methods, it is necessary to calculate information criteria for all model candidates: one line and two second-order curves (mixture number=3), three third-order curves and two fourth-order curves (mixture number=5), etc. For example, if $C_{max}=10$ and $D_{max}=10$, the number of model candidates is about 100,000, and if $C_{max}=20$ and $D_{max}=20$, the number of model candidates is about ten billion and the complexity of each model candidate to be searched increases exponentially.

In addition to the above-mentioned methods, methods based on other model selection criteria such as an Akaike's information criterion and cross-validation have been proposed. However, any of the methods does not make it possible to avoid combinations of types of components.

Non Patent Literature 6 proposes a method of minimizing an expectation information criterion of a hidden variable with a minimum description length known as equivalent to a Bayesian information criterion to efficiently search the number and types of models to be mixed. However, in this method, a Fischer information matrix of a mixture model is nonregular due to the same reason as in the method 1), and thus the criterion itself is improper and optimal model selection is impossible.

An object of the present invention is to solve the problem and to provide a mixture model estimation device, a mixture model estimation method, and a mixture model estimation program in which with respect to the model selection issue of mixture model, model selection can be rapidly done based on a proper criterion regarding the number of model candidates which increase exponentially as the number and types to be mixed increase.

Solution to Problem

A first aspect of the present invention provides a mixture model estimation device including: a data input unit for inputting data of a mixture model to be estimated, and candidate values for a mixture number, and types and parameters of components constituting the mixture model that are necessary for estimating the mixture model of the data; a processing unit which sets the mixture number from the candidate values, calculates a variation probability of a hidden variable for a random variable which is a target for estimating the mixture model of the data with respect to the set mixture number, and optimally estimates the mixture model by optimizing the types and parameters of the components using the calculated variation probability of the hidden variable so that a lower bound of a model posterior probability separated for each of the components of the mixture model is maximized; and a model estimation result output unit which outputs a model estimation result obtained by the processing unit.

A second aspect of the present invention provides a mixture model estimation method including: by using a data input unit, inputting data of a mixture model to be estimated, and candidate values for a mixture number, and types and parameters of components constituting the mixture model that are necessary for estimating the mixture model of the data; causing a processing unit to set the mixture number from the candidate values, calculate a variation probability of a hidden variable for a random variable which is a target for estimating the mixture model of the data, and optimally estimate the mixture model by optimizing the types and parameters of the components using the calculated variation probability of the hidden variable so that a lower bound of a model posterior probability separated for each of the components of the mixture model is maximized; and causing a model estimation result output unit to output a model estimation result obtained by the processing unit.

A third aspect of the present invention provides a mixture model estimation program for operating a computer as a mixture model estimation device including: a data input unit for inputting data of a mixture model to be estimated, and candidate values for a mixture number, and types and parameters of components constituting the mixture model that are necessary for estimating the mixture model of the data; a processing unit which sets the mixture number from the candidate values, calculates a variation probability of a hidden variable for a random variable which is a target for estimating the mixture model of the data with respect to the set mixture number, and optimally estimating the mixture model by optimizing the types and parameters of the components using the calculated variation probability of the hidden variable so that a lower bound of a model posterior probability separated for each of the components of the mixture model is maximized; and a model estimation result output unit which outputs a model estimation result obtained by the processing unit.

Advantageous Effect of the Invention

According to the present invention, with respect to the model selection issue of mixture model, model selection can be rapidly done based on a proper criterion regarding the number of model candidates which increase exponentially as the number and types to be mixed increase.

DESCRIPTION OF EMBODIMENTS

Figure 1:
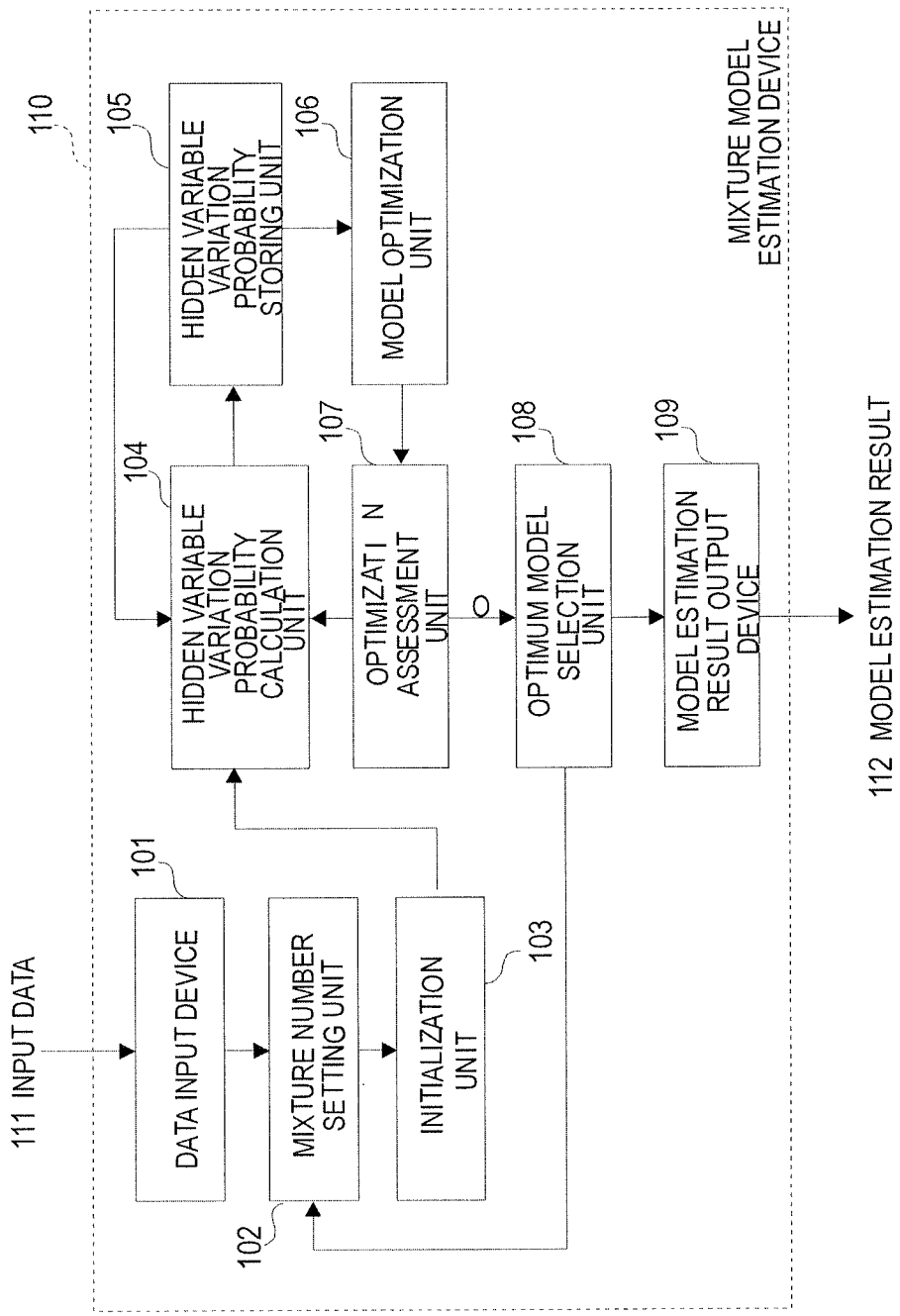
FIG. 1 A figure illustrates a block diagram for showing the structure of a mixture model estimation device according to an embodiment of the present invention.

Hereinafter, a mixture model estimation device, a mixture model estimation method, and a mixture model estimation program will be described in detail according to embodiments of the present invention with reference to the drawings.

The embodiments of the present invention propose a device and method for estimating a mixture model represented by $P(X|\theta)$ of equation 1 for input data (observed values).

[Math. 1]

$$P(X|\theta) = \sum_{c=1}^{C} \pi_c P_c(X; \phi_c^{S_c}) \qquad (1)$$

In equation 1, C denotes a mixture number, X denotes a random variable that is the target of mixture model estimation for input data, $\theta = (\pi_1, \ldots, \pi_C, \phi_1^{S_1}, \ldots, \phi_C^{S_C})$ denotes parameters of models (components), and $S_1, \ldots, S_C$ denote types of the components ($\pi_1, \ldots, \pi_C$ of the parameters $\theta$ denote mixture ratios when the mixture number is 1 to C, and $\phi_1^{S_1}, \ldots, \phi_C^{S_C}$ denote distribution parameters of components $S_1$ to $S_C$ when the mixture number is 1 to C). In addition, for example, component candidates that can be components $S_1$ to $S_C$ may be {normal distribution, logarithmic normal distribution, and exponential distribution} in the case of mixture distributions or may be {zeroth to third order curves} in the case of a mixture polynomial curve model. In addition, $\theta$ is a function of a mixture number C and component types $S_1, \ldots, S_C$. However, a description of the function is omitted for conciseness.

Next, a hidden variable $Z = (Z_1, \ldots, Z_C)$ will be defined for the random variable X. $Z_c = 1$ means that X is data from the $c^{th}$ component, and $Z_c = 0$ means that X is data from other than the $c^{th}$ component. In addition, $\sum_{c=1}^{C} Z_c = 1$. A pair of X and Z is called "a complete variable" (on the contrary, X is called "an incomplete variable"). A joint distribution of the complete variable is defined by $P(X, Z|\theta)$ as shown in equation 2.

[Math. 2]

$$P(X, Z \mid \theta) = \sum_{c=1}^{C} (\pi_c P_c(X; \phi_c^{S_c}))^{Z_c} \quad (2)$$

In the following description, N observed values (data) of the random variable X are denoted by $x_n$ (n=1, ..., N), and N values of the hidden variable Z for the observed values $x_n$ are denoted by $Z_n$(n=1, ..., N). The posterior probabilities of the values $z_n$ of the hidden variable Z are expressed by $P(z_n|x_n, \theta)$ as shown in equation 3.

[Math. 3]

$$P(z_n|x_n,\theta) \propto \pi_c P_c(x_n;\phi_c^{S_C}) \quad (3)$$

Although a mixture model is described in the embodiment, the present invention is not limited thereto. For example, the present invention may easily be applied to similar models such as a hidden Markov model derived by expanding a mixture model. Similarly, although distribution of a target random variable X is described in the embodiment, the present invention is not limited thereto. For example, the present invention may be applied to a conditional model P(Y|X) (Y is a target random variable) such as a mixture regression model and a mixture classification model.

Referring to FIG. 1, according to an embodiment of the present invention, data (input data) 111 expressed by a plurality of models constituting a mixture model are input to a mixture model estimation device 110, and the mixture model estimation device 110 optimizes a mixture number and types of components for the input data 111 and outputs a model estimation result 112. The mixture model estimation device 110 includes a data input device (data input unit) 101, a mixture number setting unit 102, an initialization unit 103, a hidden variable variation probability calculation unit 104, a hidden variable variation probability storage unit 105, a model optimization unit 106, an optimization assessment unit 107, an optimal model selection unit 108, and a model estimation result output device (model estimation result output unit) 109.

The mixture number setting unit 102, the initialization unit 103, the hidden variable variation probability calculation unit 104, the model optimization unit 106, the optimization assessment unit 107, and the optimal model selection unit 108 are processing units of the present invention, which are constructed, for example, by a computer (a central processing unit (CPU), a processor, a data processing device, etc) operating according to control of a program. The hardware and software structures thereof may be any structures as long as functions thereof can be realized.

The data input device 101 is provided to input data 111, and when data are input to the data input device 101, parameters necessary for model estimation such as types and parameters of components and candidate values for mixture number are also input. As long as the data 111 and parameters necessary for model estimation can be input, the data input device 101 may be constructed in any structure. For example, the data input device 101 may be constructed using a device such as a communication device, a storage device, and a computer.

The mixture number setting unit 102 sets a model mixture number by selecting from input candidate values. Hereinafter, the set mixture number will be denoted by C.

The initialization unit 103 performs an initialization process for estimation. Initialization may be performed by any method. For example, types of components may be randomly set for each component, and according to the set types, parameters of each component may be randomly set and the variation probability of a hidden variable may be randomly set.

The hidden variable variation probability calculation unit 104 calculates the variation probability of a hidden variable. The parameters θ are calculated by the initialization unit 103 or the model optimization unit 106, and the hidden variable variation probability calculation unit 104 uses the calculated values.

A variation probability q(Z) of a hidden variable is calculated by solving an optimization problem expressed by equation 4.

[Math. 4]

$$q^{(t)} = \operatorname*{argmax}_{q(Z^N)} \left\{ \max_{\bar{q}(Z^N) \in Q^{(t-1)}} (G(H^{(t-1)}, \theta^{(t-1)}, q(Z^N), \bar{q}(Z^N))) \right\} \quad (4)$$

$Z^N = Z_1, \ldots, Z_N$ denotes a hidden variable of data, and a superscript (t) is used to denote a value obtained through calculations after t iterations. In addition, a model is defined as $H = (S_1, \ldots, S_C)$. G to be optimized denotes the lower bound of a Bayesian posterior probability calculated by equation 5. In addition, the hidden variable variation probability storage unit 105 stores $Q_{(t-1)} = \{q^{(0)}, q^{(1)}, \ldots, q^{(t-1)}\}$ which is a set of hidden variable variation probabilities calculated by the previous iteration.

[Math. 5]

$$G(H, \theta, q(Z^N), \bar{q}(Z^N)) = \sum_{Z^N} q(Z^N) \left\{ \log P(X^N, Z^N \mid \theta) - \frac{C-1}{2} \log N - \sum_{c=1}^{C} \frac{J_c}{2} \left( \log \left( \sum_{n=1}^{N} \bar{q}(Z_{nc}) \right) + \frac{\sum_{n=1}^{N} Z_{nc} - \sum_{n=1}^{N} \bar{q}(Z_{nc})}{\sum_{n=1}^{N} \bar{q}(Z_{nc})} \right) - \log q(Z^N) \right\} \quad (5)$$

The hidden variable variation probability storage unit 105 stores hidden variable variation probabilities calculated by the hidden variable variation probability calculation unit 104 for respective data ($Q^{(t-1)}$ mentioned in the previous paragraph is updated to $Q^{(t)}$). As long as the hidden variable variation probability storage unit 105 is a storage device such as a memory capable of storing hidden variable variation probabilities calculated for respective data, the hidden variable variation probability storage unit 105 may have any structure. For example, the hidden variable variation probability storage unit 105 may be provided in or outside a computer.

The model optimization unit 106 reads the hidden variable variation probabilities $Q^{(t)}$ stored in the hidden variable variation probability storage unit 105 and calculates an optimal model $H^{(t)}$ and parameters $\theta^{(t)}$ after t iterations by using equation 6.

[Math. 6]

$$H^{(t)}, \theta^{(t)} = \operatorname*{argmax}_{H,\theta} \left\{ \max_{\bar{q}(Z^N) \in Q^{(t)}} (G(H, \theta, q^{(t)}(Z^N), \bar{q}(Z^N))) \right\} \quad (6)$$

An important point of the above-described processing is that since an optimization function can be separated according to components, $S_1$ to $S_C$ and parameter $\phi_1^{S1}$ to $\phi_C^{SC}$ of G defined by equation 5 can be individually optimized without considering combinations of types of the components (without considering which types of $S_1$ to $S_C$ are designated). Therefore, when the types of components are optimized, optimization can be performed without combinational explosion.

The optimization assessment unit 107 determines whether the lower bound of a model posterior probability calculated using equation 7 converges.

[Math. 7]

$$\max_{q(Z^N) \in Q^{(t)}} G(H^{(t)}, \theta^{(t)}, q^{(t)}(Z^N), \overline{q}(Z^N)) - \max_{q(Z^N) \in Q^{(t-1)}} G(H^{(t-1)}, \theta^{(t-1)}, q^{(t-1)}(Z^N), \overline{q}(Z^N)) \quad (7)$$

If it is determined that the lower bound of the model posterior probability does not converge, processes of the hidden variable variation probability calculation unit 104 to the optimization assessment unit 107 are repeated.

In this way, processes of the hidden variable variation probability calculation unit 104 to the optimization assessment unit 107 are repeated to optimize a model and parameters, and thus an appropriate model can be selected which maximizes the lower bound of the model posterior probability. Monotonic increase of the lower bound of the model posterior probability by the repeating processes is explained by equation 8.

[Math. 8]

$$\max_{q(Z^N) \in Q^{(t)}} G(H^{(t)}, \theta_H^{(t)}, q^{(t)}(Z^N), \overline{q}(Z^N)) \geq \quad (8)$$
$$\max_{q(Z^N) \in Q^{(t)}} G(H^{(t-1)}, \theta_H^{(t-1)}, q^{(t)}(Z^N), \overline{q}(Z^N)) \geq$$
$$\max_{q(Z^N) \in Q^{(t-1)}} G(H^{(t-1)}, \theta_H^{(t-1)}, q^{(t)}(Z^N), \overline{q}(Z^N)) \geq$$
$$\max_{q(Z^N) \in Q^{(t-1)}} G(H^{(t-1)}, \theta_H^{(t-1)}, q^{(t-1)}(Z^N), \overline{q}(Z^N))$$

The types of components and parameters are optimized through the processes performed from the hidden variable variation probability calculation unit 104 to the optimization assessment unit 107 by using the mixture number C set by the mixture number setting unit 102.

If the maximized lower bound of the model posterior probability value (the first member of equation 7) is greater than the currently-set lower bound of the model posterior probability, the optimal model selection unit 108 sets the model as an optimized model. If an optimal mixture number is calculated after the lower bound of a model posterior probability (and types of components and parameters) is calculated for all the candidate values for mixture number, the procedure goes to the model estimation result output device 109, and if there is a mixture number candidate with which optimization is not yet performed, the procedure goes back to the mixture number setting unit 102.

The model estimation result output device 109 outputs a model estimation result 112 such as the optimized mixture number, types of components, and parameters. As long as the model estimation result output device 109 can output the model estimation result 112, the model estimation result output device 109 may have any structure. For example, the model estimation result output device 109 may be constructed using a device such as a communication device, a storage device, and a computer.

Figure 2:
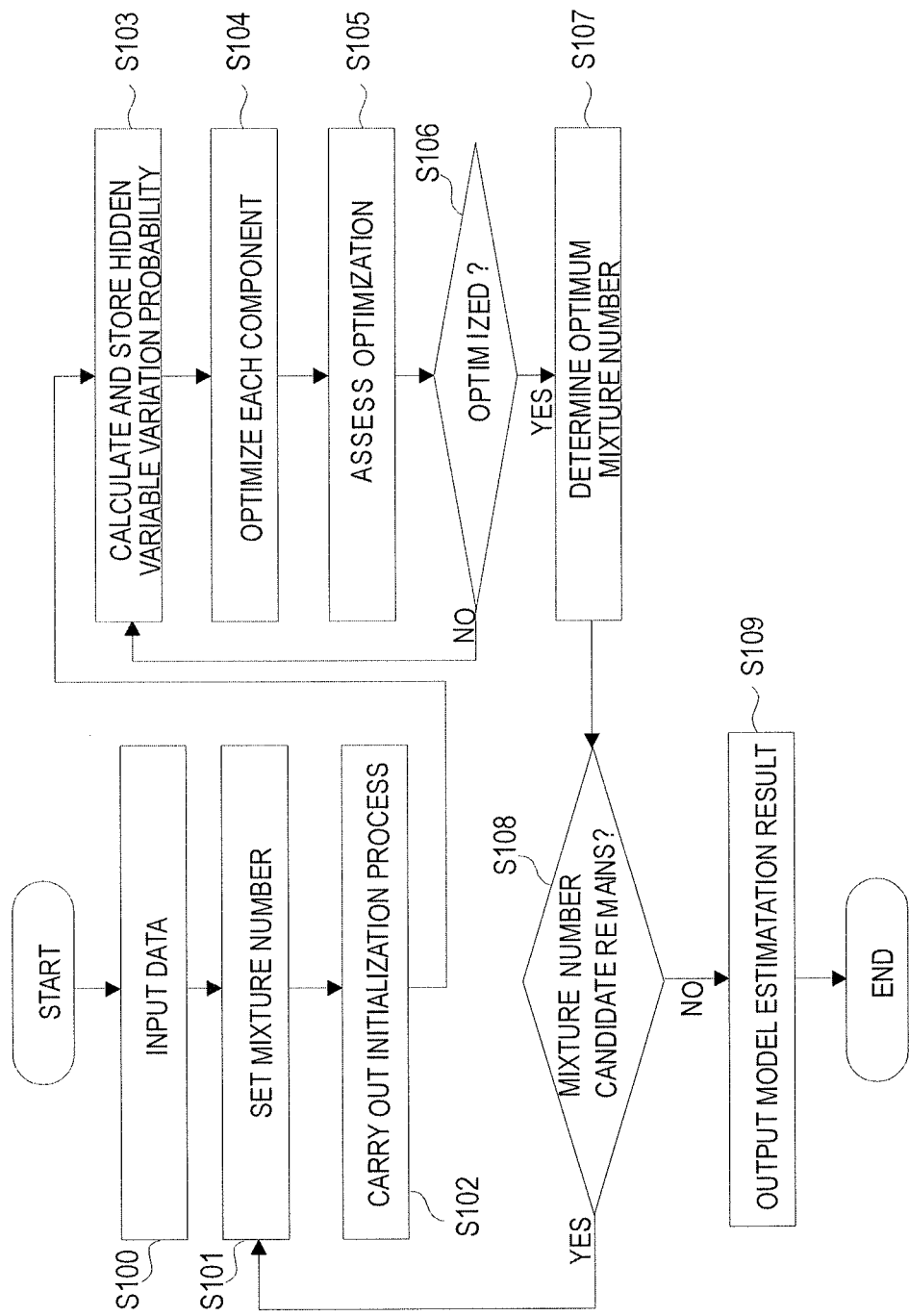
FIG. 2 A figure illustrates a flowchart for showing operations of the mixture model estimation device illustrated in FIG. 1.

Referring to FIG. 2, operations of the mixture model estimation device 110 are briefly explained according to the embodiment.

First, data 111 is input to the data input device 101 (Step S100).

Next, the mixture number setting unit 102 selects a non-optimized mixture number from input candidate values for mixture number (Step S101).

Next, the initialization unit 103 initializes parameters and hidden variable variation probabilities for estimation with respect to the designated mixture number (Step S102)

Next, the hidden variable variation probability calculation unit 104 calculates hidden variable variation probabilities and stores the calculated variation probabilities in the hidden variable variation probability storage unit 105 (Step S103).

Next, the model optimization unit 106 estimates types and parameters of respective components (Step S104).

Next, the optimization assessment unit 107 determines whether the lower bound of a model posterior probability converges (Steps S105 and S106).

If it is determined that lower bound of the model posterior probability does not converge (Step S106: NO), Steps S103 to S106 are repeated at the hidden variable variation probability calculation unit 104, the model optimization unit 106, and the optimization assessment unit 107.

If it is determined that the lower bound of the model posterior probability converges (Step S106: YES), the optimal model selection unit 108 compares the lower bound of the model posterior probability of a currently-set optimal model (mixture number, types, and parameters) with the lower bound of the model posterior probability of a model obtained through calculations until Step 106, and sets one of the models having a larger lower bound as an optimal model (Step S107).

Next, it is determined whether there remains a non-estimated mixture number candidate (S108).

If there remains a non-estimated mixture number candidate (Step S108: YES), the procedures at Steps S101 to S108 are repeated at the mixture number setting unit 102, the initialization unit 103, the hidden variable variation probability calculation unit 104, the model optimization unit 106, the optimization assessment unit 107, and the optimal model selection unit 108.

If there does not remain a non-estimated mixture number candidate (Step S108: NO), the model estimation result output device 109 outputs a model estimation result 112, and the procedure ends (Step S109).

Therefore, according to the embodiment, all the number, types, and parameters of models to be mixed can be efficiently estimated by maximizing the lower bound of a model posterior probability. That is, the lower bound of a model posterior probability separated for respective components is optimized by repeating optimization processes so as to optimize the types and parameters of components and the number of the components.

In this way, with respect to the model selection issue of mixture model, model selection can be rapidly done based on a proper criterion regarding the number of model candidates which increase exponentially as the number and types to be mixed increase.

Hereinafter, models to which the mixture model estimation device of the embodiment is applicable, and application examples thereof will be specifically described.

EXAMPLE 1

(Mixture Distributions Having Different Independence Characteristics)

If the mixture model estimation device of the embodiment is used, a mixture number and independence of each component can be rapidly optimized for a plurality of mixture distributions of multidimensional data that have different independence characteristics.

For example, in the case of a three-dimensional normal distribution, dimension-independent (dependent) eight combinations can be derived, and normal distributions independent of each other (positions of non-diagonal non-zero elements of a covariance matrix) can be derived as component candidates.

For example, if distribution estimation is performed on input data about check values (weights, blood pressures, blood sugar values, etc) of medical examinations conducted on people having different ages, genders, and life habits, dependence of the check values on ages, genders, and life habits can be automatically modeled. In addition to the modeling of such dependence, check item groups having different dependent relationships can extracted (clustering) by inspecting posterior probability values of a hidden variable to find out matching between data and their origin components.

In addition, the mixture model estimation device of the embodiment can be used for any multidimensional distributions as well as multidimensional normal distributions.

EXAMPLE 2

(Various Mixture Distributions)

If the mixture model estimation device of the embodiment is used, a mixture number and types of component distributions can be optimized for a plurality of different mixture distributions.

For example, in the case of distribution candidates each including a normal distribution, a logarithmic normal distribution, and an exponential distribution, a mixture distribution in which the number and parameters of distributions are optimized can be calculated.

For example, application to operational risk estimation will be explained. Generally, in a risk distribution, a plurality of event groups having low risks (for example, office procedure misses which are modeled as a logarithmic normal distribution) are mixed with a low-frequency event group having high risks (for example, miss orders of stocks which are modeled as a normal distribution having a high mean value).

Although there are a plurality of types of risks (multivariate), the present invention can be used to automatically and properly determine the types, number, and parameters of distributions and thus estimate a risk distribution.

The mixture model estimation device of the embodiment is not limited to applications to particular distributions such as a normal distribution, a logarithmic normal distribution, and an exponential distribution, but can be applied to any types of distributions.

EXAMPLE 3

(Mixture Distributions of Different Stochastic Regression Functions)

If the mixture model estimation device of the embodiment is used, a regression function relating to a mixture number and types of components can be rapidly optimized for mixture distributions of different stochastic regression functions.

For example, a regression-curve mixture model having a polynomial curve (or a curved surface in the case of multidimensional data) will now be explained. In this case, a polynomial curve having terms of different orders may be selected as a candidate of each component. If the mixture model estimation device of the present invention is used, a mixture number and orders of a polynomial curve of each component can be optimized.

The mixture model estimation device of the embodiment is not limited to applications to a polynomial curve, but can be applied to a mixture model having any regression functions of a plurality of types.

EXAMPLE 4

(Mixture Distributions of Different Stochastic Discriminant Functions)

If the mixture model estimation device of the embodiment is used, a classifier function relating to a mixture number and each component can be optimized for mixture distributions of different discriminant functions.

For example, an explanation will be given of a failure diagnosis for identifying the types of failures of an automobile using sensor values obtained from automobile data. Since sensors to notice are determined according to failures, automobiles, running conditions, sensor values for which a classifier function is used are changed.

If the mixture model estimation device of the embodiment is used, although various data are involved, a classifier function using a plurality of sensor values can be automatically estimated (for example, sensor values for a component candidate can be determined).

EXAMPLE 5

(Mixture Distributions of Hidden MarKov Model Having Different Output Probabilities)

If the mixture model estimation device of the embodiment is used, a hidden state number and the types of output probabilities, and parameters can be optimized for a hidden Markov model having different output probabilities.

For example, even in the case of different distributions the output probabilities of which are in normal distribution, logarithmic distribution, and exponential distribution due to hidden states, a hidden Markov model in which the number and parameters of distributions are optimized can be studied.

For example, although estimation of hidden states and output probabilities is important in voice recognition, voices measured under different environments result in different output probabilities due to different noise conditions. However, according to the embodiment, efficient model estimation is possible under such conditions.

The mixture model estimation device may be provided in the form of hardware, software, or a combination thereof. In this case, the structure of hardware or software is not limited to a particular structure but can be any form as long as the above-described functions can be provided.

The above-described embodiments and Examples are partially or entirely expressed in the following Supplementary Notes. However, the present invention is not limited thereto.

(Supplementary Note 1) A mixture model estimation device includes: a data input unit that inputs data of a mixture model to be estimated, and candidate values for a mixture number, and types and parameters of components constituting the mixture model that are necessary for estimating the mixture model of the data; a processing unit that sets the mixture number from the candidate values, calculates a variation probability of a hidden variable for a random variable which is a target for estimating the mixture model of the data with respect to the set mixture number, and optimally estimating the mixture model by optimizing the types and components of the components using the calculated variation probability of the hidden variable so that a lower bound of a model posterior probability separated for each of the components of the mixture model is maximized; and a model estimation result output unit which outputs a model estimation result obtained by the processing unit.

(Supplementary Note 2) In the mixture model estimation device of Supplementary Note 1, the processing unit obtains the mixture number of the mixture model optimally by calculating the lower bound of the model posterior probability and the types and parameters of the components for all the candidate values for the mixture number.

(Supplementary Note 3) In the mixture model estimation device of Supplementary Note 1 or 2, if the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1, if the hidden variable for the random variable X is denoted by $Z=(Z_1, \ldots, Z_C)$, a joint distribution of a complete variable that is a pair of the random variable X and the hidden variable Z is defined by equation 2, if N data values of the random variable X are denoted by $x_n (n=1, \ldots, N)$, and N values of the hidden variable Z for the values $x_n$ are denoted by $z_n (n=1, \ldots, N)$, a posterior probability of the hidden variable Z is expressed by equation 3, wherein the processing unit calculates the variation probability of the hidden variable by solving an optimization problem expressed by equation 4 where $Z^N=Z_1, \ldots, Z_N$ denotes the hidden variable, $Q^{(t)}=\{q^{(0)}, q^{(1)}, \ldots, q^{(t)}\}$ (a superscript (t) means a value calculated after t iterations) denotes the variation probability of the hidden variable, $H=(S_1, \ldots, S_C)$ denotes the mixture model, and G denotes the lower bound of the model posterior probability; the processing unit calculates the lower bound of the model posterior probability by equation 5; the processing unit calculates an optimal mixture model $H^{(t)}$ and parameters $\theta^{(t)}$ of components of the optimal mixture model after t iterations by using the variation probability of the hidden variable and equation 6; the processing unit determines whether the lower bound of the model posterior probability converges by using equation 7; if the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained through calculation, and sets the lager value as the, wherein the processing unit repeats the processes of equation 4 to equation 7 for all the candidate values for the mixture number so as to estimate the mixture model optimally.

(Supplementary Note 4) In the mixture model estimation device of any one of Supplementary Notes 1 to 3, the mixture model includes a plurality of mixture distributions having different independence characteristics.

(Supplementary Note 5) In the mixture model estimation device of any one of Supplementary Notes 1 to 3, the mixture model includes a plurality of various mixture distributions.

(Supplementary Note 6) In the mixture model estimation device of any one of Supplementary Notes 1 to 3, the mixture model includes mixture distributions of different stochastic regression functions.

(Supplementary Note 7) In the mixture model estimation device of any one of Supplementary Notes 1 to 3, the mixture model includes mixture distributions of different stochastic discriminant functions.

(Supplementary Note 8) In the mixture model estimation device of any one of Supplementary Notes 1 to 3, the mixture model includes mixture distributions of a hidden Markov model having different output probabilities.

(Supplementary Note 9) A mixture model estimation method includes: by using an input unit, inputting data of a mixture model to be estimated, and candidate values for a mixture number, and types and parameters of components constituting the mixture model that are necessary for estimating the mixture model of the data; causing a processing unit to set the mixture number from the candidate values, calculate a variation probability of a hidden variable for a random variable which is a target for estimating the mixture model of the data, and optimally estimate the mixture model by optimizing the types and parameters of the components using the calculated variation probability of the hidden variable so that a lower bound of a model posterior probability separated for each of the components of the mixture model is maximized; and causing a model estimation result output unit to output a model estimation result obtained by the processing unit.

(Supplementary Note 10) In the mixture model estimation method of Supplementary Note 9, the processing unit obtains the mixture number of the mixture model optimally by calculating the lower bound of the model posterior probability and the types and parameters of the components for all the candidate values for the mixture number.

(Supplementary Note 11) In the mixture model estimation method of Supplementary Note 10 or 11, if the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1, if the hidden variable for the random variable X is denoted by $Z=(Z_1, \ldots, Z_C)$, a joint distribution of a complete variable that is a pair of the random variable X and the hidden variable X is defined by equation 2, if N data values of the random variable X are denoted by $X_n (n=1, \ldots, N)$, and N values of the hidden variable Z for the values $X_n$ are denoted by $Z_n (n=1, \ldots, N)$, a posterior probability of the hidden variable Z is expressed by equation 3, wherein the processing unit calculates the variation probability of the hidden variable by solving an optimization problem expressed by equation 4 where $Z_n=Z_1, \ldots, Z_N$ denotes the hidden variable, $Q^{(t)}=\{q^{(0)}, q^{(1)}, \ldots, q^{(t)}\}$ (a superscript (t) means a value calculated after t iterations) denotes the variation probability of the hidden variable, $H=(S_1, \ldots, S_C)$ denotes the mixture model, and G denotes the lower bound of the model posterior probability; the processing unit calculates the model posterior probability by equation 5; the processing unit calculates an optimal mixture model $H^{(t)}$ and parameters $\theta^{(t)}$ of components of the optimal mixture model after t iterations by using the variation probability of the hidden variable and equation 6; the processing unit determines whether the lower bound of the model posterior probability converges by using equation 7; if the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained after the current iteration, wherein the processing unit repeats the processes of equation 4 to equation 7 for all the candidate values for the mixture number so as to estimate the mixture model optimally.

(Supplementary Note 12) In the mixture model estimation method of any one of Supplementary Notes 9 to 11, the mixture model includes a plurality of mixture distributions having different independence characteristics.

(Supplementary Note 13) In the mixture model estimation method of any one of Supplementary Notes 9 to 11, the mixture model includes a plurality of various mixture distributions.

(Supplementary Note 14) In the mixture model estimation method of any one of Supplementary Notes 9 to 11, the mixture model includes mixture distributions of different stochastic regression functions.

(Supplementary Note 15) In the mixture model estimation method of any one of Supplementary Notes 9 to 11, the mixture model includes mixture distributions of different stochastic discriminant functions.

(Supplementary Note 16) In the mixture model estimation method of any one of Supplementary Notes 9 to 11, the mixture model includes mixture distributions of a hidden Markov model having different output probabilities.

(Supplementary Note 17) A mixture model estimation program operates a computer as a mixture model estimation device including: a data input unit that inputs data of a mixture model to be estimated, and candidate values for a mixture number, and types and parameters of components constituting the mixture model that are necessary for estimating the mixture model of the data; a processing unit that sets the mixture number from the candidate values, calculates a variation probability of a hidden variable for a random variable which is a target for estimating the mixture model of the data with respect to the set mixture number, and optimally estimates the mixture model by optimizing the types and parameters of the components using the calculated variation probability of the hidden variable so that a lower bound of a model posterior probability separated for each of the components of the mixture model is maximized; and a model estimation result output unit that outputs a model estimation result obtained by the processing unit.

(Supplementary Note 18) In the mixture model estimation program of Supplementary Note 17, the optimal mixture number of the mixture model is optimally obtained by calculating the lower bound of the model posterior probability and the types and parameters of the components for all the candidate values for the mixture number.

(Supplementary Note 19) In the mixture model estimation program of Supplementary Note 17 or 18, if the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1, if the hidden variable for the random variable X is denoted by $Z=(Z_1, \ldots, Z_C)$, a joint distribution of a complete variable that is a pair of the random variable X and the hidden variable X is defined by equation 2, if N data values of the random variable X are denoted by $X_n (n=1, \ldots, N)$, and N values of the hidden variable Z for the values $X_n$ are denoted by $Z_n (n=1, \ldots, N)$, a posterior probability of the hidden variable Z is expressed by equation 3, wherein the processing unit calculates the variation probability of the hidden variable by solving an optimization problem expressed by equation 4 where $Z_n = Z_1, \ldots, Z_N$ denotes the hidden variable, $Q^{(t)} = \{q^{(0)}, q^{(1)}, \ldots, q^{(t)}\}$ a superscript (t) means a value calculated after t iterations) denotes the variation probability of the hidden variable, $H=(S_1, \ldots, S_C)$ denotes the mixture model, and G denotes the lower bound of the model posterior probability; the processing unit calculates the model posterior probability by equation 5; the processing unit calculates an optimal mixture model $H^{(t)}$ and parameters $\theta^{(t)}$ of components of the optimal mixture model after t iterations by using the variation probability of the hidden variable and equation 6; the processing unit determines whether the lower bound of the model posterior probability converges by using equation 7; if the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained after the current iteration, wherein the processing unit repeats the processes of equation 4 to equation 7 for all the candidate values for the mixture number so as to estimate the mixture model optimally.

(Supplementary Note 20) In the mixture model estimation program of any one of Supplementary Notes 17 to 19, the mixture model includes a plurality of mixture distributions having different independence characteristics.

(Supplementary Note 21) In the mixture model estimation program of any one of Supplementary Notes 17 to 19, the mixture model includes a plurality of various mixture distributions.

(Supplementary Note 22) In the mixture model estimation program of any one of Supplementary Notes 17 to 19, the mixture model includes mixture distributions of different stochastic regression functions.

(Supplementary Note 23) In the mixture model estimation program of any one of Supplementary Notes 17 to 19, the mixture model includes mixture distributions of different stochastic discriminant functions.

(Supplementary Note 24) In the mixture model estimation program of any one of Supplementary Notes 17 to 19, the mixture model includes mixture distributions of a hidden Markov model having different output probabilities.

While the present invention has been described with reference to the embodiments and Examples thereof, the present invention is not limited to the embodiments and Examples. It will be understood by those of ordinary skill in the art that the structure and details of the present invention may be variously changed within the scope of the present invention.

The present application claims priority to Japanese Patent Application No.: 2011-060732, filed on Mar. 18, 2011, which is hereby incorporated by reference in its entirety.

INDUSTRIAL APPLICABILITY

As described above, the present invention can be used as a multivariate data mixture model estimation device, a mixture model estimation method, or a mixture model estimation program. For example, the present invention can be used as a device, a method, or a program for estimating a mixture model for a plurality of mixture distributions having different independence characteristics, a plurality of various mixture distributions, mixture distributions of different types of stochastic regression functions, mixture distributions of different types of stochastic discriminant functions, a hidden Markov model having different output probabilities, etc.

REFERENCE SIGNS LIST 101 data input device (date input unit)
102 mixture number setting unit
103 initialization unit
104 hidden variable variation probability calculation unit
105 hidden variable variation probability storage unit
106 model optimization unit
107 optimization assessment unit
108 optimal model selection unit
109 model estimation result output device (model estimation result output unit)
110 mixture model estimation device
111 input data
112 model estimation result

The invention claimed is:
1. A mixture model estimation device comprising:
a data input unit that inputs data of a mixture model to be estimated, and candidate values for a mixture number, and types and parameters of components constituting the mixture model that are necessary for estimating the mixture model of the data;
a processing unit comprising a computer hardware processor that sets the mixture number from the candidate values, calculates a variation probability of a hidden variable for a random variable which is a target for estimating the mixture model of the data with respect to the set mixture number, and optimally estimates the mixture model by optimizing the types and parameters of the components using the calculated variation probability of the hidden variable so that a lower bound of a model posterior probability separated for each of the components of the mixture model is maximized; and
a model estimation result output unit that outputs a model estimation result obtained by the processing unit,
wherein:
the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1:

$$P(X \mid \theta) = \sum_{c=1}^{C} \pi_c P_c(X; \phi_c^{S_c}) \quad (1)$$

when the hidden variable for the random variable X is denoted by $Z_1=(Z_1, \ldots, Z_C)$, a joint distribution of a complete variable that is a pair of the random variable X and the hidden variable Z is defined by equation 2:

$$P(X, Z \mid \theta) = \sum_{c=1}^{C} (\pi_c P_c(X; \phi_c^{S_c}))^{Z_c} \quad (2)$$

when N data values of the random variable X are denoted by $X_n (n=1, \ldots, N)$, and N values of the hidden variable Z for the values $X_n$ are denoted by $Z_n (n=1, \ldots, N)$, a posterior probability of the hidden variable Z is expressed by equation 3:

$$P(z_n \mid x_n, \theta) \propto \pi_c P_c(x_n; \phi_c^{S_c}) \quad (3)$$

the processing unit calculates the variation probability of the hidden variable by solving an optimization problem expressed by equation 4:

$$q^{(t)} = \operatorname*{argmax}_{q(Z^N)} \left\{ \max_{\bar{q}(Z^N) \in Q^{(t-1)}} (G(H^{(t-1)}, \theta^{(t-1)}, q(Z^N), \bar{q}(Z^N))) \right\} \quad (4)$$

where $Z^N = Z_1, \ldots, Z_N$ denotes the hidden variable, $Q^{(t)} = \{q^{(0)}, q^{(1)}, \ldots, q^{(t)}\}$ (a superscript (t) means a value calculated after t iterations) denotes the variation probability of the hidden variable, $H=(S_1, \ldots, S_C)$ denotes the mixture model, and G denotes the lower bound of the model posterior probability, the processing unit calculates the lower bound of the model posterior probability by equation 5:

$$G(H, \theta, q(Z^N), \bar{q}(Z^N)) = \sum_{Z^N} q(Z^N) \left\{ \log P(X^N, Z^N \mid \theta) - \frac{C-1}{2} \log N - \sum_{c=1}^{C} \frac{J_c}{2} \left( \log \left( \sum_{n=1}^{N} \bar{q}(Z_{nc}) \right) + \frac{\sum_{n=1}^{N} Z_{nc} - \sum_{n=1}^{N} \bar{q}(Z_{nc})}{\sum_{n=1}^{N} \bar{q}(Z_{nc})} \right) - \log q(Z^N) \right\} \quad (5)$$

the processing unit calculates an optimal mixture model $H^{(t)}$ and parameters $\theta^{(t)}$ of components of the optimal mixture model after t iterations by using the variation probability of the hidden variable by equation 6:

$$H^{(t)}, \theta^{(t)} = \operatorname*{argmax}_{H, \theta} \left\{ \max_{\bar{q}(Z^N) \in Q^{(t)}} (G(H, \theta, q^{(t)}(Z^N), \bar{q}(Z^N))) \right\} \quad (6)$$

the processing unit determines whether the lower bound of the model posterior probability converges by using equation 7:

$$\max_{q(Z^N)\in Q^{(t)}} G(H^{(t)}, \theta^{(t)}, q^{(t)}(Z^N), \bar{q}(Z^N)) - \quad (7)$$

$$\max_{q(Z^N)\in Q^{(t-1)}} G(H^{(t-1)}, \theta^{(t-1)}, q^{(t-1)}(Z^N), \bar{q}(Z^N))$$

when the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained through calculations, and sets the larger value as the optimal mixture model, and the processing unit repeats the processes of equation 4 to equation 7 for all the candidate values for the mixture number so as to estimate the mixture model optimally.

2. The mixture model estimation device according to claim 1, wherein the processing unit obtains the mixture number of the mixture model optimally by calculating the lower bound of the model posterior probability and the types and parameters of the components for all the candidate values for the mixture number.

3. The mixture model estimation device according to claim 1, wherein the mixture model comprises a plurality of mixture distributions having different independence characteristics.

4. The mixture model estimation device according claim 1, wherein the mixture model comprises a plurality of various mixture distributions.

5. The mixture model estimation device according to claim 1, wherein the mixture model comprises mixture distributions of different stochastic regression functions.

6. The mixture model estimation device according to claim 1, wherein the mixture model comprises mixture distributions of different stochastic discriminant functions.

7. The mixture model estimation device according to claim 1, wherein the mixture model comprises mixture distributions of a hidden Markov model having different output probabilities.

8. A mixture model estimation method comprising:

by using an input unit, inputting data of a mixture model to be estimated, and candidate values for a mixture number, and types and parameters of components constituting the mixture model that are necessary for estimating the mixture model of the data;

causing a processing unit to set the mixture number from the candidate values, calculate a variation probability of a hidden variable for a random variable which is a target for estimating the mixture model of the data, and optimally estimate the mixture model by optimizing the types and parameters of the components using the calculated variation probability of the hidden variable so that a lower bound of a model posterior probability separated for each of the components of the mixture model is maximized; and causing a model estimation result output unit to output a model estimation result obtained by the processing unit, wherein:

the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1:

$$P(X|\theta) = \sum_{c=1}^{C} \pi_c P_c(X; \phi_c^{S_c}) \quad (1)$$

the hidden variable for the random variable X is denoted by $Z=(Z_1, \ldots, Z_C)$, a joint distribution of a complete variable that is a pair of the random variable X and the hidden variable X is defined by equation 2:

$$P(X, Z|\theta) = \sum_{c=1}^{C} (\pi_c P_c(X; \phi_c^{S_c}))^{Z_c} \quad (2)$$

if N data values of the random variable X are denoted by $X_n$ (n=1, ..., N), and N values of the hidden variable Z for the values $X_n$ are denoted by $Z_n$ (n=1, ..., N), a posterior probability of the hidden variable Z is expressed by equation 3:

$$P(z_n|x_n,\theta) \propto \pi_c P_c(x_n; \phi_c^{S_c}) \quad (3)$$

the processing unit calculates the variation probability of the hidden variable by solving an optimization problem expressed by equation 4:

$$q^{(t)} = \operatorname*{argmax}_{q(Z^N)} \left\{ \max_{\bar{q}(Z^N)\in Q^{(t-1)}} (G(H^{(t-1)}, \theta^{(t-1)}, q(Z^N), \bar{q}(Z^N))) \right\} \quad (4)$$

where $Z_n=Z_1, \ldots, Z_N$ denotes the hidden variable, $Q^{(t)}=\{q^{(0)}, q^{(1)}, \ldots, q^{(t)}\}$ (a superscript (t) means a value calculated after t iterations) denotes the variation probability of the hidden variable, $H=(S_1, \ldots, S_C)$ denotes the mixture model, and G denotes the lower bound of the model posterior probability; the processing unit calculates the model posterior probability by equation 5:

$$G(H, \theta, q(Z^N), \bar{q}(Z^N)) = \sum_{Z^N} q(Z^N) \left\{ \log P(X^N, Z^N|\theta) - \frac{C-1}{2}\log N - \sum_{c=1}^{C} \frac{J_c}{2}\left(\log\left(\sum_{n=1}^{N}\bar{q}(Z_{nc})\right) + \frac{\sum_{n=1}^{N} Z_{nc} - \sum_{n=1}^{N}\bar{q}(Z_{nc})}{\sum_{n=1}^{N}\bar{q}(Z_{nc})}\right) - \log q(Z^N) \right\} \quad (5)$$

the processing unit calculates an optimal mixture model $H^{(t)}$ and parameters $\theta^{(t)}$ of components of the optimal mixture model after t iterations by using the variation probability of the hidden variable and equation 6:

$$H^{(t)}, \theta^{(t)} = \operatorname*{argmax}_{H,\theta} \left\{ \max_{\bar{q}(Z^N)\in Q^{(t)}} (G(H, \theta, q^{(t)}(Z^N), \bar{q}(Z^N))) \right\} \quad (6)$$

the processing unit determines whether the lower bound of the model posterior probability converges by using equation 7:

$$\max_{q(Z^N)\in Q^{(t)}} G(H^{(t)}, \theta^{(t)}, q^{(t)}(Z^N), \bar{q}(Z^N)) - \max_{q(Z^N)\in Q^{(t-1)}} G(H^{(t-1)}, \theta^{(t-1)}, q^{(t-1)}(Z^N), \bar{q}(Z^N)) \quad (7)$$

when the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained after the current iteration, wherein the processing unit repeats the processes of equation 4 to equation 7 for all the candidate values for the mixture number so as to estimate the mixture model optimally.

9. In the mixture model estimation method of claim 8, the processing unit obtains the mixture number of the mixture model optimally by calculating the lower bound of the model posterior probability and the types and parameters of the components for all the candidate values for the mixture number.

10. In the mixture model estimation method of claim 8, the mixture model includes a plurality of mixture distributions having different independence characteristics.

11. In the mixture model estimation method of claim 8, the mixture model includes a plurality of various mixture distributions.

12. In the mixture model estimation method of claim 8, the mixture model includes mixture distributions of different stochastic regression functions.

13. In the mixture model estimation method of claim 8, the mixture model includes mixture distributions of different stochastic discriminant functions.

14. In the mixture model estimation method of claim 8, the mixture model includes mixture distributions of a hidden Markov model having different output probabilities.

15. A non-transitory compute readable medium storing a computer-readable mixture model estimation program for operating a computer as a mixture model estimation device comprising:
an input unit that inputs data of a mixture model to be estimated, and candidate values for a mixture number, and types and parameters of components constituting the mixture model that are necessary for estimating the mixture model of the data;
a processing unit comprising a processor that sets the mixture number from the candidate values, calculates a variation probability of a hidden variable for a random variable which is a target for estimating the mixture model of the data with respect to the set mixture number, and optimally estimates the mixture model by optimizing the types and parameters of the components using the calculated variation probability of the hidden variable so that a lower bound of a model posterior probability separated for each of the components of the mixture model is maximized; and
a model estimation result output unit that outputs a model estimation result obtained by the processing unit, wherein
the mixture number is denoted by C, the random variable is denoted by X, the types of the components are denoted by $S_1, \ldots, S_C$, and the parameters of the components are denoted by $\theta=(\pi_1, \ldots, \pi_C, \phi_1^{S1}, \ldots, \phi_C^{SC})$ ($\pi_1, \ldots, \pi_C$ are mixture ratios when the mixture number is 1 to C, and $\phi_1^{S1}, \ldots, \phi_C^{SC}$ are parameters of distributions of components $S_1$ to $S_C$ when the mixture number is 1 to C), the mixture model is expressed by equation 1:

$$P(X \mid \theta) = \sum_{c=1}^{C} \pi_c P_c(X; \phi_c^{S_c}) \quad (1)$$

when the hidden variable for the random variable X is denoted by $Z=(Z_1, \ldots, Z_C)$, a joint distribution of a complete variable that is a pair of the random variable X and the hidden variable X is defined by equation 2:

$$P(X, Z \mid \theta) = \sum_{c=1}^{C} (\pi_c P_c(X; \phi_c^{S_c}))^{Z_c} \quad (2)$$

when N data values of the random variable X are variable X are denoted by $X_n$ (n=1, ..., N), and N values of the hidden variable Z for the values $X_n$ are denoted by $Z_n$ (n=1, ..., N), a posterior probability of the hidden variable Z is expressed by equation 3:

$$P(z_n|x_n,\theta) \propto \pi_c P_c(x_n; \phi_c^{S_c}) \quad (3)$$

the processing unit calculates the variation probability of the hidden variable by solving an optimization problem expressed by equation 4:

$$q^{(t)} = \operatorname*{argmax}_{q(Z^N)} \left\{ \max_{q(Z^N)\in Q^{(t-1)}} (G(H^{(t-1)}, \theta^{(t-1)}, q(Z^N), \bar{q}(Z^N))) \right\} \quad (4)$$

where $Z_n=Z_1, \ldots, Z_N$ denotes the hidden variable, $Q^{(t)}=\{q^{(0)}, q^{(1)}, \ldots, q^{(t)}\}$ (a superscript (t) means a value calculated after t iterations) denotes the variation probability of the hidden variable, $H=(S_1, \ldots, S_C)$ denotes the mixture model, and G denotes the lower bound of the model posterior probability; the processing unit calculates the model posterior probability by equation 5:

$$G(H, \theta, q(Z^N), \bar{q}(Z^N)) = \sum_{Z^N} q(Z^N) \Biggl\{ \log P(X^N, Z^N \mid \theta) - \frac{C-1}{2}\log N - \sum_{c=1}^{C} \frac{J_c}{2}\left( \log\left(\sum_{n=1}^{N} \bar{q}(Z_{nc})\right) + \frac{\sum_{n=1}^{N} Z_{nc} - \sum_{n=1}^{N} \bar{q}(Z_{nc})}{\sum_{n=1}^{N} \bar{q}(Z_{nc})} \right) - \log q(Z^N) \Biggr\} \quad (5)$$

the processing unit calculates an optimal mixture model $H^{(t)}$ and parameters $\theta^{(t)}$ of components of the optimal mixture model after t iterations by using the variation probability of the hidden variable and equation 6:

$$H^{(t)}, \theta^{(t)} = \underset{H,\theta}{\mathrm{argmax}} \left\{ \underset{q(Z^N) \in Q^{(t)}}{\max} (G(H, \theta, q^{(t)}(Z^N), \overline{q}(Z^N))) \right\} \quad (6)$$

the processing unit determines whether the lower bound of the model posterior probability converges by using equation 7:

$$\underset{q(Z^N) \in Q^{(t)}}{\max} G(H^{(t)}, \theta^{(t)}, q^{(t)}(Z^N), \overline{q}(Z^N)) - \underset{q(Z^N) \in Q^{(t-1)}}{\max} G(H^{(t-1)}, \theta^{(t-1)}, q^{(t-1)}(Z^N), \overline{q}(Z^N)) \quad (7)$$

when the processing unit determines that the lower bound of the model posterior probability does not converge, the processing unit repeats processes of equation 4 to equation 7, and if the processing unit determines that the lower bound converges, the processing unit compares a lower bound of a model posterior probability of a currently-set optimal mixture model with the lower bound of the model posterior probability obtained after the current iteration, wherein the processing unit repeats the processes of equation 4 to equation 7 for all the candidate values for the mixture number so as to estimate the mixture model optimally.

16. In the mixture model estimation program of claim 6, the optimal mixture number of the mixture model is optimally obtained by calculating the lower bound of the model posterior probability and the types and parameters of the components for all the candidate values for the mixture number.

17. In the mixture model estimation program of claim 6, the mixture model includes a plurality of mixture distributions having different independence characteristics.

* * * * *

UNITED STATES PATENT AND TRADEMARK OFFICE
CERTIFICATE OF CORRECTION

PATENT NO. : 8,731,881 B2  
APPLICATION NO. : 13/824857  
DATED : May 20, 2014  
INVENTOR(S) : Ryohei Fujimaki and Satoshi Morinaga Page 1 of 1

It is certified that error appears in the above-identified patent and that said Letters Patent is hereby corrected as shown below:

In the Claims,

Column 16, Line 9: In Claim 1, delete "$Z_1$" and insert -- Z --

Column 19, Line 46: In Claim 15, delete "compute readable" and insert -- computer-readable --

Column 20, Line 28-29: In Claim 15, before "denoted" delete "variable X are"

Column 22, Line 12: In Claim 16, delete "claim 6" and insert -- claim 15 --

Column 22, Line 17: In Claim 17, delete "claim 6" and insert -- claim 15 --

Signed and Sealed this  
Thirteenth Day of January, 2015

Michelle K. Lee  
*Deputy Director of the United States Patent and Trademark Office*